US010511475B2

(12) United States Patent
Borowicz et al.

(10) Patent No.: US 10,511,475 B2
(45) Date of Patent: *Dec. 17, 2019

(54) SYSTEMS AND METHODS FOR DATA MOBILITY WITH A CLOUD ARCHITECTURE

(71) Applicant: Level 3 Communications, LLC, Broomfield, CO (US)

(72) Inventors: James Edward Borowicz, Westminster, CO (US); Kevin Dean Wein, Broomfield, CO (US); William Charles Ramthun, Erie, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/155,575

(22) Filed: Oct. 9, 2018

(65) Prior Publication Data

US 2019/0044798 A1 Feb. 7, 2019

Related U.S. Application Data

(63) Continuation of application No. 13/840,341, filed on Mar. 15, 2013, now Pat. No. 10,097,406.

(60) Provisional application No. 61/612,896, filed on Mar. 19, 2012.

(51) Int. Cl.
*H04L 12/24* (2006.01)
*G06F 16/27* (2019.01)

(52) U.S. Cl.
CPC ............. *H04L 41/08* (2013.01); *G06F 16/27* (2019.01)

(58) Field of Classification Search
CPC ...................................................... H04L 41/08
See application file for complete search history.

(56) References Cited

U.S. PATENT DOCUMENTS

| | | | | |
|---|---|---|---|---|
| 7,640,274 | B2 * | 12/2009 | Tinker | G06F 12/0866 |
| 7,921,259 | B2 | 4/2011 | Elazary | |
| 8,028,062 | B1 | 9/2011 | Wigmore et al. | |
| 2005/0251500 | A1 | 11/2005 | Vahalia et al. | |
| 2006/0123065 | A1 | 6/2006 | Rapp | |
| 2007/0230752 | A1 * | 10/2007 | Nochta | G06Q 10/087 382/124 |
| 2010/0036914 | A1 | 2/2010 | Chesta | |

(Continued)

FOREIGN PATENT DOCUMENTS

| | | |
|---|---|---|
| WO | WO-2011034482 | 3/2011 |

OTHER PUBLICATIONS

Canada Examination Report, dated Feb. 6, 2019, Application No. 2,867,911, filed Mar. 18, 2013; 3 pgs.

(Continued)

*Primary Examiner* — Ario Etienne
*Assistant Examiner* — Sm Z Islam

(57) ABSTRACT

Aspects of the present disclosure describe systems and corresponding methods for storing and/or redistributing data within a network. In various aspects, data and/or sets of data stored in a database, data store, or other type of database storage system may be pulled, pushed, distributed, redistributed, or otherwise positioned at one or more data caches and/or servers strategically located across an enterprise network, a content delivery network ("CDN"), etc., and may be accessible over such networks, other networks, and/or the Internet.

15 Claims, 5 Drawing Sheets

300-1
A
325
RECEIVE REQUEST TO ACCESS DATA ON A NETWORK
330
CONFIGURE ONE OR MORE RESOURCES TO ACCESS THE DATA BASED ON THE REQUEST
335
DETERMINE AN APPROPRIATE LOCATION TO POSITION THE DATA AND THE ONE OR MORE RESOURCES WITHIN THE NETWORK BASED ONE OR MORE METRICS
340
POSITION THE DATA AND THE ONE OR MORE RESOURCES USED TO ACCESS THE DATA AT THE APPROPRIATE LOCATION

(56) References Cited

U.S. PATENT DOCUMENTS

2010/0332456 A1 12/2010 Prahlad et al.
2011/0302277 A1 12/2011 Baker
2012/0213362 A1 8/2012 Bliding
2013/0151558 A1* 6/2013 Chercoles Sanchez .................... G06F 16/2471 707/770
2013/0246588 A1 9/2013 Borowicz et al.

OTHER PUBLICATIONS

Extended European Search Report, dated Nov. 25, 2015, Application No. 13764544.6, filed Mar. 18, 2013; 8 pgs.
International Preliminary Report on Patentability, dated Sep. 23, 2014, Int'l Appl. No. PCT/US13/032833, Int'l Filing Date Mar. 18, 2013; 7 pgs.
International Search Report, dated Jun. 4, 2013, Appl. No. PCT/US13/032833, Int'l Filing Date Mar. 18, 2013, 3 pgs.
Written Opinion of the Int'l Searching Authority, dated Jun. 4, 2013, Appl. No. PCT/US13/032833, Int'l Filing Date Mar. 18, 2013, 5 pgs.
Al-Shayeji, M. H. et al., "A Comparative Study on Replica Placement Algorithms for Content Delivery Networks", *Advances in Computing, Control and Telecommunication Technologies (ACT)* 2010 Second Int'l Conf on, IEEE, Piscataway, NJ; XP031840662 Dec. 2, 2010 00:00:00.0 , pp. 140-142.
Kacin, M. , "Virtually 2009", Trends and Predictions of Virtualization Technology in 2009, [retrieved on May 16, 2013]. Retrieved from the Internet: <URL:http//vmblog.com/archive/2008/12/15/virtually-2009-trends-and-predictions-of-virtualization-technology-in-2009.aspx> entire document , 4 pgs.
Pathan, Al-Mukaddim K. et al., "A Taxonomy and Survey of Content Delivery Networks", *J. Systems Architecture* Elsevier BV, NL; XP008110709; Retrieved from Internet www.gridbus.org/reports/CDN-Taxonomy.pdf on Nov. 16, 2015 Feb. 12, 2006 00:00:00.0 , pp. 1-44.
Pierre, G. et al., "Globule: A Collaborative Content Delivery Network", *IEEE Communications Magazine* IEEE Service Center, Piscataway, US, vol. 44, No. 8; XP009124838 Aug. 1, 2006 00:00:00.0 , pp. 127-133.
Ray, , "EMCWorld day 2", RayOnStorage Blog. [retrieved on May 6, 2013]. Retrieved from the Internet: <URL:http://silvertonconsulting.com/blog/2011/05/10emc-day-2/> entire document May 10, 2011 00:00:00.0 , 4 pgs.
Yingjie, Li , "Information Dissemination and Routing in Communication Networks", The Ohio State Univ., XP055228978, Retrieved from Internet etd.ohiolink.edu/!etd.send_file?accession=osu1132767756&disposition=attachment on Nov. 17, 2015 Jan. 1, 2005 00:00:00.0 , pp. 1-192.

* cited by examiner

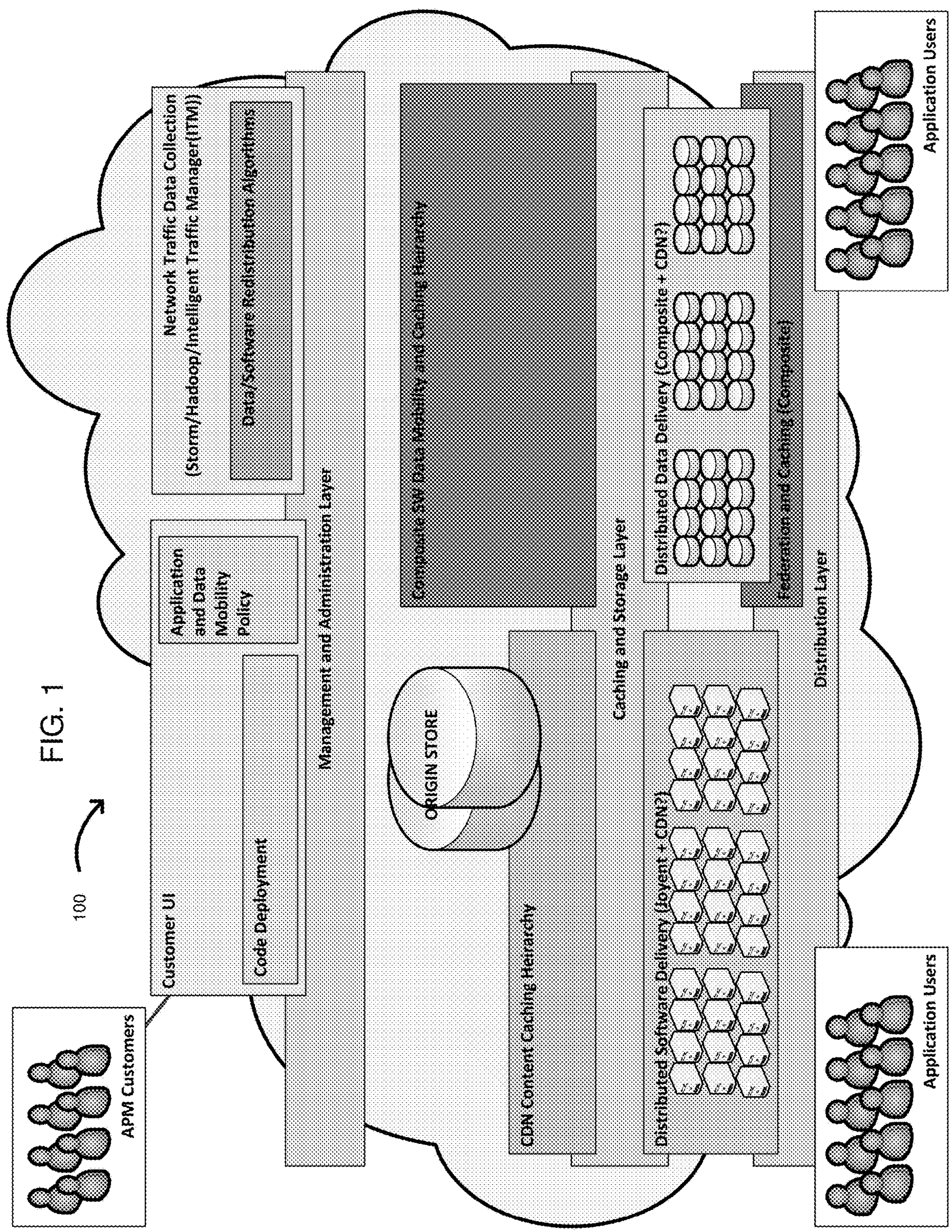
FIG. 1
100
APM Customers
Customer UI
Code Deployment
Application and Data Mobility Policy
Network Traffic Data Collection
(Storm/Hadoop/Intelligent Traffic Manager(ITM))
Data/Software Redistribution Algorithms
Management and Administration Layer
Composite SW Data Mobility and Caching Hierarchy
ORIGIN STORE
CDN Content Caching Hierarchy
Caching and Storage Layer
Distributed Data Delivery (Composite + CDN?)
Distributed Software Delivery (Joyent + CDN?)
Federation and Caching (Composite)
Distribution Layer
Application Users
Application Users

SYSTEMS AND METHODS FOR DATA MOBILITY WITH A CLOUD ARCHITECTURE

TECHNICAL FIELD

Aspects of the present disclosure relate to data management, and in particular, the management and transmission of data using a cloud computing infrastructure.

BACKGROUND

Content delivery networks ("CDNs") are used by content providers to distribute large amounts of content such as text, audio, video, images, animation, interactivity, etc., to numerous end-users. More particularly, CDNs include edge servers throughout the Internet or other networks that provide cached content to a large number of end user systems. The content is strategically placed at the various edge servers of the CDN so that the content can be served to end-users with high-availability and high performance. Stated differently, requests for content are typically algorithmically directed to edge server locations that are best for serving content to the user. For example, edge servers that are the fewest hops from the requesting user, the least number of network seconds away from the requesting user, or the highest availability in terms of server performance (both current and historic) may be identified as potential candidates for servicing a content request. Benefits of using a CDN to serve content include reducing bandwidth costs, improving load times, providing redundancy and/or increasing global availability of such content.

While certain types of content may be easily distributed among various edges of a CDN, distributing data stored within a database and/or data store throughout a CDN to provide optimal access may present challenges. Often, requests for data or subsets of data stored within a database are not as predictable, and thus, conventional methods for identifying optimal locations for distributing such data within a CDN cannot be employed. Moreover, data stored within a database and/or data store often include additional access requirements, which should be maintained by the CDN.

It is with these concepts in mind, among others, that various aspects of the present disclosure were conceived.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also in the drawings, the like reference characters refer to the same parts throughout the different views. The drawings depict only typical embodiments of the present disclosure and, therefore, are not to be considered limiting in scope.

FIG. 1 is a block diagram illustrating a computing network according to aspects of the present disclosure.

FIG. 4 is a flowchart illustrating an example rendezvous request, according to aspects of the present disclosure.

DETAILED DESCRIPTION

Figure 2A:
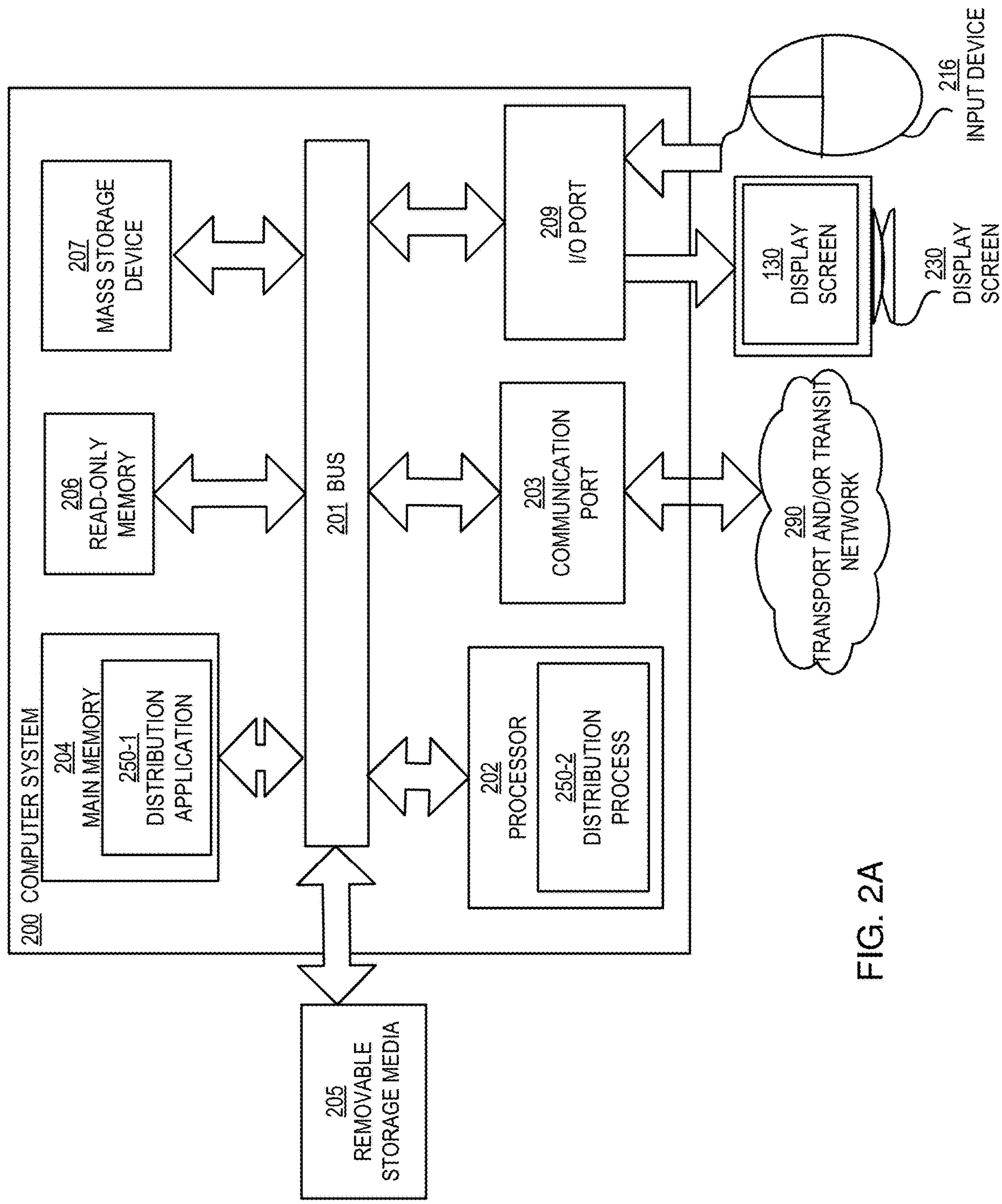
FIG. 2A is a block diagram of a computer system according to aspects of the present disclosure.

Aspects of the present disclosure describe systems and corresponding methods for storing and/or redistributing data within a network. In various aspects, data and/or sets of data, such as text, audio, video, images, animation, interactivity, and/or any combination thereof, may be pulled, pushed, distributed, redistributed, or otherwise positioned at one or more data caches and/or servers strategically located across an enterprise network, a content delivery network ("CDN"), etc., and may be accessible over such networks and/or the Internet (collectively the data caches, servers, enterprise network, CDN, and Internet being a "cloud").

Typically, businesses that provide data in the form of content to customers have a detailed understanding of its user's data access patterns. Stated differently, the businesses are aware of how and where any of its data is being accessed by users. Since the businesses provide the applications, web pages, interfaces, etc. that a user can engage to access the data, the business can record such user access and subsequently analyze the access to identify patterns. For example, businesses that provide data access through web pages understand that data accessible through their homepage and/or start page will be accessed more frequently than an associated webpage, such as a technical support FAQ web page, because the homepage will provide a wide spectrum of information and data that may be useful to many people, whereas the FAQ page will only be useful to select users. Thus, the website and data associated with the homepage may be hosted or otherwise placed on a particular server strategically located within a network to allow for frequent and efficient access.

In contrast, requests for data and/or subsets of data located within a database and/or database system is not as predictable, as requests for specific data and/or datasets are unique for each particular user request. For example, an agent, located in India, representing an international telecommunications call center, may request data stored within a database describing the telecommunications call center's trouble tickets for the last three months. Moreover, these tickets may correspond to a particular region, such as the southwestern portion of North America. Such a dataset requested by the call center agent may be unique only to that agent and only useful with respect to the applications the particular agent may be using; except for the particular user at the call center requesting such data, no other user would likely require and/or request the same dataset within the network. Moreover, in the case that other call center agents require access to data, it is unlikely that such users would require access using the exact same unique request and/or the same subset of data.

Aspects of the present disclosure describe automated techniques for determining an appropriate or optimal location at which data and/or a subset of data stored within a database, data store, or other type of database system should be located and/or otherwise redistributed within a network for more efficient access and/or delivery to requesting users. In particular, various informational metrics, such as geographic location, temporal data, cost efficiencies, etc., and/or data mobility policies, may be used to determine the appropriate location for data to be intelligently cached and/or otherwise positioned within the network. For example, data may be redistributed based on a latency metric, by redistributing the data to caches/servers that reduce the inherent latency associated with accessing a database(s) and/or data across a network. Latency is the measure of time delay experienced in a system, the precise definition of which depends on the system and the time being measured. In the context of accessing data, latency generally relates to how quickly data can be made available when the data is requested. Thus, aspects of the present disclosure may be used to redistribute the data within the network to a different location, effectively reducing access latency.

FIG. 1 illustrates an example network environment 100 suitable for implementing various aspects of the present disclosure. The network environment 100 includes a cloud 101 communicably coupling one or more layers that may be employed to redistribute data and/or data subsets stored within a database. Cloud computing refers to the delivery of computing and/or storage capacities to one or more users, in the form of a service, using a cloud. Each cloud computing "service" typically combines various functionalities and/or data of different computing resources and databases located in remote locations across the cloud into one or more individual services. Users may access the services through a web browser, desktop, mobile application, etc., to access data and perform various tasks, such as execute one or more automated queries. A cloud may be private or public. Public clouds offer services to anyone capable of accessing the Internet. In contrast, a private cloud is a proprietary network and/or data center that offers services to a limited group of users, and although the private cloud may use the public Internet in some fashion, the services are not accessible to the general public.

For example, in the illustrated embodiment, the cloud 101 includes a distribution layer 102 comprising one or more endpoint nodes, edge caches/servers, CDN caches/servers, etc. (referred to as "endpoint nodes") 104, which may be grouped together (logically and/or physically) in one or more clusters throughout the distribution layer 102. The endpoint nodes 104 are configured to perform (e.g., singularly or cooperatively) data virtualization (e.g., database virtualization) for one or more content servers (e.g., one or more origin servers/stores, which will be described in more detail below) to which the endpoint nodes 104 are communicably coupled across the cloud 101. Data virtualization describes the process of abstracting one or more independently functioning computing systems, such as databases, applications, repositories, and the like, using a single data access layer to make them all accessible from one logical place. The abstraction enables users, such as end users 112-116, to access data via the abstracted databases and/or applications using the single data access layer. For example, in the context of a data source or database, the technical aspects of how data is being stored, such as the location, storage structure, application programming interface requirements, access language, and storage technology, are abstracted away or hidden. Thus, the distribution layer 102 effectively masks the physical location and configuration of a database from querying applications, processes, and the like. In the context of an application, the distribution layer 102 encapsulates the application software from the underlying operating system on which it was originally designed to be executed.

The cloud 101 further includes a storage layer 108 including a caching hierarchy 110 capable of implementing various aspects of the data mobility functionalities described herein. The caching hierarchy 110 includes multiple levels of communicating cache (e.g., cache servers) capable of caching data and/or subsets of data stored within a database. More specifically, the various levels of cache are logically organized to enable one level of cache to forward data requests to a different level of cache, such as for example, in a parent/child relationship. A parent cache is a cache higher in the hierarchy in relation to a child cache, to which the parent cache can forward requests. Stated differently, the parent cache will attempt to process the data request before any child caches. If the parent cache cannot process the request, the parent cache will forward the request to the child cache. Using such logical connections, when requests for data are not fulfilled at one cache level, the request may be routed to a different level of cache for processing. It is contemplated that the caching hierarchy 110 may implement any type of cache hierarchy as are generally known in the art. The storage layer 108 further includes one or more origin servers/stores 112-116 that store data and/or content to be delivered to end users (118-122) by the caches/servers in the caching hierarchy 110 in conjunction with the endpoint nodes 104. An origin store represents the database, data store, server, or other type of device capable of storing data that contains the original copy of data, and further, is the storage point where the original set of data is maintained and updated.

Example caching methods include both push-based and pull-based caching between the origin servers 112-116 and the CDN hierarchy 110/endpoint nodes 104. In a pull-based scheme, endpoint nodes 104 may be instructed to pull certain data from the origin servers 112-116. Alternatively, in a push-based scheme, data and/or subsets of data may be pushed to the endpoint nodes 104. For example, the endpoint nodes located in the United States may be instructed to pull certain data or content from origin servers (e.g., via a "follow-the-sun" approach) based on a determination that the data is considered to be popular (i.e., frequently requested at and/or delivered) by endpoint nodes located in Europe. Follow-the-sun is a type of workflow and/or data center model in which tasks are passed around daily between work sites that are many time zones apart. Such a workflow model is implemented to reduce project duration and increase responsiveness. The work is "following the sun" and never stops. For example, at the end of the day, a systems support team in Denver, Colo. will pass its work tasks to a support team in Bangalore, India which, at the end of its day, passes its work back to Denver, Colo.

Referring again to FIG. 1, the cloud 101 also includes an administration layer 118 that is configured to manage the distribution and/or redistribution of data stored within the cloud 101 (e.g., within the storage layer 108). More particularly, the administration layer 118 is configured to process input, such as a data mobility policy (data mobility policies will be described in detail below) received from a customer 120, such as via a user interface 128, to determine where data should be located or relocated within the cloud 101. Subsequently, the administration layer 118 may deploy the data and any corresponding resources (e.g., an instance of an application and/or database as will be described below) that enable access to the data to the identified location within the cloud 101.

Figure 2B:
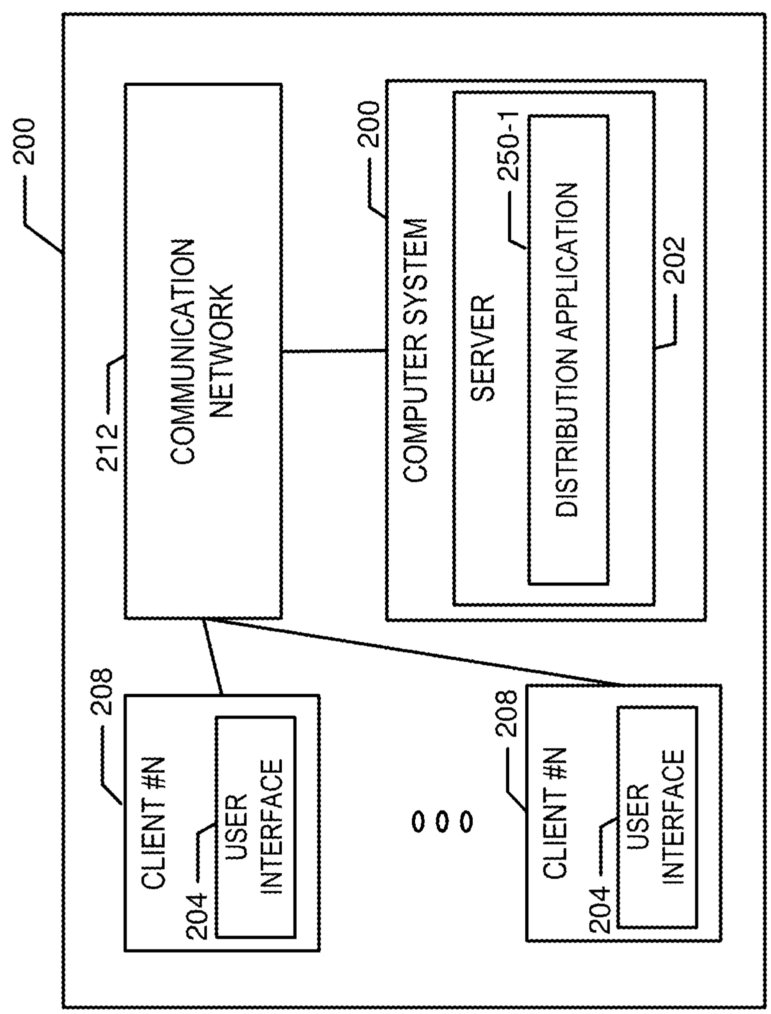
FIG. 2B is another block diagram illustrating a computing environment for distributing data within a network, according to aspects of the present disclosure.
Figure 2C:
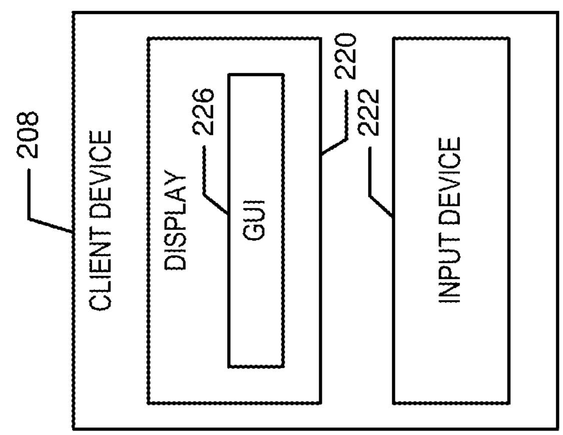

FIGS. 2A-2B illustrate various computing environments and/or computing systems capable of implementing embodiments of the present disclosure, and in particular, the various layers of the cloud 101. FIG. 2A is an example computing environment 200 that includes a server computing device 202 capable of executing computer instructions, functions, and/or processes of the distribution layer 102, the storage layer 108, and/or the administration layer 118, such as a distribution application 204, which may be executed to determine an appropriate or optimal location at which data and/or a subset of data stored within a database, data store, or other type of database system should be distributed or redistributed within a network, such as the cloud 101. In particular, the server computing device 202 may execute the distribution application 204 to determine an optimal location at which data and/or a specific subset of data within a database should be located and subsequently store and maintain the data to the identified location.

The server computing device 202 may be in operable communication (e.g., via cloud 101) with at least one customer device 208, which may be a computing or processing device, including one or more processors 210 and memory 212, which is configured to receive data and/or communications from, and/or transmit data and/or communications to the server 202 via the cloud 101. The customer device 208 may further include a display 220, such as a computer monitor, for displaying data and/or graphical user interfaces. The customer device 208 may also include an input device (not shown) such as a keyboard or a pointing device (e.g., a mouse, trackball, pen, or touch screen) to enter data into or interact with graphical user interfaces and a graphical user interface (or GUI) application, such as a browser application, to generate a graphical user interface 226 on the display 220.

A customer interested in strategically redistributing data and/or a subset of data within the cloud 101 may interact with the graphical user interface 226 of the customer device 208 to generate a request including instructions for initially storing the data within the various layers of the cloud 101. For example, an international telecommunications call center may store massive amounts of trouble ticket data within the cloud 101. The data may initially be stored, in one embodiment, within the origin servers/stores 112-116 of the storage layer 108.

Additionally, the customer may interact with the graphical user interface 226 of the customer device 208 to provide input articulating how any of its data and/or subset of data stored within the cloud 101 should be strategically redistributed throughout the cloud 101 when a user requests access to such data. The request may be transmitted to and/or received by the server computing device 202 and processed by the distribution application 204, which may redistribute, copy, and/or move the requested data or subset of data to various locations within the cloud 101 for efficient access. For example, one or more end users 112-116 may interact with the end user devices 230-234 to query or otherwise request access to the stored data and/or a subset of stored data, and in response, the distribution application 204 may strategically distribute the data within the cloud 101. The end user devices 230-234 may be any type of processing device, such as a thin client device, a laptop computer, a personal digital assistant, a tablet computer, a standard personal computer, and the like.

FIG. 2B is a block diagram illustrating the various hardware and/or software components of the server computing device 202. As illustrated, in one embodiment, the server computing device 202 includes a processing system 236 including one or more processes that may be used to execute the various computer instructions, functions, and/or processes. The processing system 202 may include memory and/or be in communication with a memory 238, which may include volatile and/or non-volatile memory. The server computing device 202 also includes a database 240, which may be a general repository of data, including any data that a customer is interested in distributing and/or redistributing within the cloud 101. For example, assume a customer, such as a stock trading enterprise, has large amounts of data stored locally corresponding to countless numbers of stock trades. The database 240 may store such data for distribution and/or redistribution throughout the cloud 101. The database 240 may include memory and one or more processors or processing systems to receive, process, query, and transmit communications and store and retrieve such data. In another aspect, the database 240 may be a database server.

The server computing device 202 may include a computer readable media ("CRM") 242, which may include computer storage media, communication media, and/or another available computer readable media medium that can be accessed by the processing system 236. For example, the CRM 242 may include non-transient computer storage media and communication media. By way of example and not limitation, computer storage media includes memory, volatile media, non-volatile media, removable media, and/or non-removable media implemented in a method or technology for storage of information, such as machine/computer readable/executable instructions, data structures, program modules, or other data. Communication media includes machine/computer readable/executable instructions, data structures, program modules, or other data.

The CRM 242 may store executable instructions to implement the distribution application 204 and/or associated functions, processes, etc. Generally, program modules include routines, programs, instructions, objects, components, data structures, etc., that perform particular tasks or implement particular abstract data types. Accordingly, the processing system 236 may launch, run, execute, interpret, or otherwise perform the logical instructions and/or processes of the distribution application 204, such as process 300 illustrated in FIG. 3, which depicts an example method and/or process for determining an appropriate or optimal location at which data and/or a subset of data stored within a database, data store, or other type of database system should be located within a network.

Figure 3:
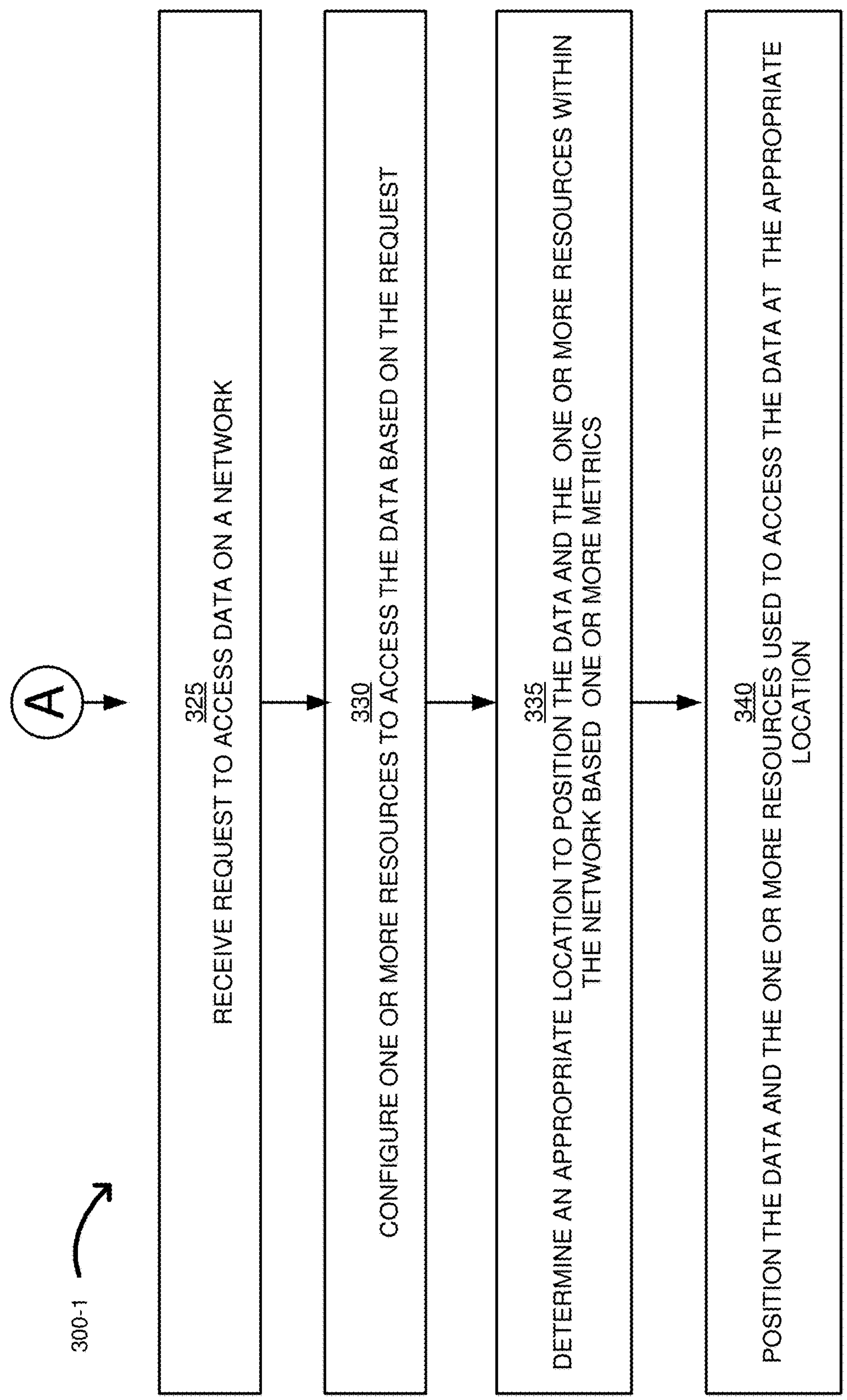
FIG. 3 is a flowchart illustrating an example process for automatically distributing data, according to aspects of the present disclosure.

Referring now to FIGS. 2A-2B as well as FIG. 3, process 300 begins with receiving a request to distribute data and/or otherwise redistribute data within a network (operation 302). For example, a customer interested in distributing data within a network may interact with the customer device 208 to generate a request. In response, a user interface module 244 may transmit instructions that may be processed and/or executed to display one or more input forms on the customer device 208 that include various components capable of receiving input from a user articulating: 1) the specific data and/or subset of data to be initially distributed within the network; and 2) how the data and/or subset of data should be strategically redistributed when the data is subsequently accessed. In one embodiment, the user may access a web portal, such as a customer portal, through a secure web-browser (e.g., Microsoft Explorer®, Mozilla Firefox®, Safari® or the like) on one or more of the customer devices 208, to provide input to the various input forms identifying the specific data to be accessed.

For example, a telecommunications call center may include a large database that is responsible for storing all of the data required to support the telecommunications call center's business applications (massive amounts of data). However, the telecommunications call center may only be interested in querying a small subset, or aggregate, subset of the data, such as data roll-ups and/or statistical data aggregations. Data aggregation is any process in which information is gathered and expressed in a summary form for purposes such as statistical analysis. Accordingly, the telecommunications call center may provide input indicating that the telecommunications call center would like to access and/or query subsets of data corresponding to the telecommunications call center's trouble tickets for the last three months. In any event, in one embodiment, the distribution application 204 may transmit instructions that may be processed to display one or more input forms for identifying and/or accessing data and/or subsets of data for distribution and storage within the cloud 101.

In another embodiment, the input forms provided for display on the customer device 208 by the user interface module 244 may include various components capable of receiving input from a user for provisioning one or more computing resources for use in accessing the distributed data. For example, the input forms may include components for provisioning a relational database, object-oriented database, hierarchical database, network database, or other type of database storing data organized in tables, records, objects, other data structures, and the like. In one particular embodiment, a user, using the graphical user interface of the distribution application 204, may select to provision a small database or database container and provide input describing a database schema corresponding to the provisioned database/database container. Subsequently, the user interface module 244 may push and/or provide the database schema into a deployment mechanism, such as one or more of the origin servers of the cloud 101.

The input forms provided for display on the customer device 208 by the user interface module 244 may include various components capable of receiving input to configure or otherwise provision other resources, such as an instance of an application and/or application container (e.g. a resource) for accessing the data within the provisioned database or data store. An application container represents the software, protocols, expandable components, and/or infrastructures required to provide access to the requested data. Additionally, the input forms provided for display on the customer device 208 by the user interface module 244 may include various components capable of receiving input for identifying, selecting, and/or otherwise describing a data mobility policy that may be used to intelligently redistribute or position the data and any corresponding computing resources (e.g., a database or application container) within the network. A data mobility policy describes the conditions and rules by which data may be distributed or redistributed between the various layers of the cloud 101. Thus, the provisioned instance of an application, application container, and/or data mobility policy may dictate (e.g., as specified by a customer) when, where, and/or how customer data or content is stored, distributed, and/or delivered (e.g., delivery to requesting users) throughout the various layers of the cloud 101. For example, a data mobility policy may describe a particular type of data and the rights for accessing such data. As another example, the data mobility policy may restrict data access based on geographic location, effectively blocking certain data from leaving a certain geographic location.

When input corresponding to the configuration of various computing resources is received, a deployment module 246 may automatically configure and/or otherwise provision an instance of the various resources for distribution within the network (operation 304). For example, in one embodiment, if the resource is an application, an instance of the application may be configured. An application instance represents a specific realization of an executable application. Stated differently, each time an application is executed, an instance of the application is created. Thus, an instance of the application is stored within the storage layer 108, such as at one or more of the origin stores 112-116. If the resource includes a database schema, the data base schema is processed to construct a database containing the identified data and/or subset of data. After all of the required resources have been configured (if necessary), the identified data is stored within the storage layer 108, such as at one or more of the origin stores 112-116. Subsequently, when a resource is requested, the resource is distributed, storage is allocated, and the process of populating the storage with any data needed to implement and execute the resource is moved or otherwise maintained and cached in the edges. For example, in the context of an application, when a user distributes the application, the application code would be distributed, storage is allocated for the code, and the process for populating the storage with needed data to run the application and any user requested data is moved to and cached in the edges.

Once the data has been initially stored within the cloud 101, a request for at least a portion of the data may be received from a user desiring access to the data and/or subset of the data (operation 306). For example, referring to the international telecommunication call center example discussed above, an agent working for the call center may require access to a portion of the telecommunication call center data stored within the cloud 101. In response, an appropriate or optimal location for copying, storing, caching, distributing, and/or otherwise redistributing the location of the data and any corresponding resources—application containers, applications, application instances, databases—required to access the data at the appropriate and/or optimal location within the network is determined (operation 308). More specifically, a redistribution module 248 may generate recommendations for data redistribution at specific optimal locations within and among the origin server(s), CDN content delivery hierarchy, and/or endpoint nodes 104 based on factors and/or informational metrics such as, by way of non-limiting example, data or content popularity (and if/when a popularity threshold has been met or exceeded), other predictive considerations and techniques (e.g., regular expressions, pattern recognition, etc.), geographical considerations (e.g., proximity of end users, origin servers, etc.), time or temporal considerations (e.g., using a "follow-the-sun" approach), load conditions on CDN servers and/or endpoint nodes 104, network or cloud conditions, dynamic cache replacement policies, and so on. In one particular embodiment, geographic load balancing may be employed, in which, in response to a user request, the location of the user is identified and the user's request is directed to the edge closest to the user that is capable of processing the request.

If a data mobility policy is received as part of the input provided by a user, the redistribution module 248 may process the data mobility policy and any described metrics within the policy to identify the optimal and/or appropriate location to position the data and any corresponding resources. For example, the redistribution module 248 may process a data mobility policy including cost metrics to determine the most cost-efficient location within the caching and storage layer and/or the distribution layer of the network environment 100. Thus, the instance of the application and data mobility policy may specify one or more of such factors when employing the data/software redistribution module 248 to generate redistribution recommendations.

The desired data and any corresponding application containers, databases, etc., may be cached, moved, placed, and/or otherwise copied to the identified appropriate or optimal network location ("new location") within the network (operation 310). Initially, to identify the desired data and/or subset of data within the cloud 101 that will be copied to the new location, the redistribution module 248 may employ redirection and/or rendezvous functionality in conjunction with a Domain Name Service. Redirection is the process of switching a standard stream of data so that it is transmitted from a source other than its default source, or that is received at a destination other than its default. Rendezvous is a set of protocols that enables a device on a network to automatically recognize and connect with other devices on the same network.

FIG. 4 illustrates an example flow for initially locating the "best" locations from which to obtain the desired data using rendezvous. A user issues a request 401 for access to data stored within the cloud 101. In response, the redistribution module 248 may interact with the rendezvous system 402 to determine the "best" location to initially search for the desired data or subset of data. Specifically, the redistribution module 248 may generate or otherwise initiate a rendezvous request 403 to identify the best location within the storage layer 108 of the cloud 101. If the rendezvous system 402 is integrated with a domain name system 404 as illustrated, the rendezvous system 402 and domain name system 404 may interact to identify the "best" location. For example, the rendezvous system 402 may provide one or more Internet Protocol address(es) 405 identifying the best locations from which to obtain the desired data. Once the best locations are identified, the redistribution module 248 attempts to access the desired data. If the desired data is available, the data and any corresponding application containers, databases, etc., may be cached, moved, placed, and/or otherwise copied to the new location within the cloud 101. If the desired data was not available, the redistribution module 248 attempts to locate the data at various other locations (e.g. via conventional CDN methods) within the cloud 101 until a copy of the desired data is located. Subsequently, the redistribution module 248 caches and/or otherwise copies the desired data and any corresponding resources to the new location within the cloud 101, making such data accessible to end users.

To move the actual data to the new location, various locking mechanisms (a lock is a mechanism that prohibits two transactions from manipulating the same data within a data source at the same time) may be used to ensure the integrity of the data is maintained. For example, the data may be cached in the caching and storage layer of the network 100 using a token pattern where a token is required to request and reserve specific data, effectively disabling others from writing to such data until the token is returned or expires. Referring to the Denver/Bangalore scenario above, a portion of a database associated with the popular data or content (i.e., on one or more origin servers) is designated as writeable for a specific user, such that that portion of the database can be replicated (or virtualized) on endpoint nodes in the United States. Stated differently, the database is configured to allow the popular data or content to be continuously stored, copied, deleted, edited, etc., at the various endpoint nodes using such locking mechanisms.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for providing data mobility comprising:

at least one processor; and memory, operatively connected to the at least one processor and storing instructions that, when executed by the at least one processor, cause the system to:

receive, from a client, user instructions identifying a data subset of data and how the data subset of the data is to be redistributed within a network when the data subset is subsequently requested to be accessed on the network;

configure one or more resources for accessing the data subset of the data, the data stored in a first database at a first location within the network, the one or more resources comprising a second database for storing the data subset;

determine a second location within the network to position the data subset and the one or more resources based on one or more metrics and the user instructions; and provide, in response to a request to access the data subset, access to the data subset by:

storing the data subset within the second database; and positioning the second database at the second location within the network.

2. The system of claim 1, wherein the one or more resources further comprises an application container and wherein providing access to the data subset further comprises storing the application container at the second location to enable the access to the data subset stored in the second database.

3. The system of claim 1, wherein the instructions, when executed, further cause the system to receive a request to access the data stored within the network, the request comprising a query resulting in the data subset.

4. The system of claim 1, wherein the network is a cloud, wherein the one or more metrics is selected from the group consisting of latency, cost efficiencies, temporal considerations, and geographic location.

5. The system of claim 1, wherein the instructions, when executed, further cause the system to generate a plurality of input forms for receiving the instructions.

6. A method for providing data mobility comprising:

receiving, from a client and at at least one processor, user instructions identifying a data subset of data and how the data subset of the data is to be redistributed within a network when the data subset is subsequently requested to be accessed on the network;

configuring one or more resources for accessing the data subset of the data, the data stored in a first database at a first location within the network, the one or more resources comprising a second database for storing the data subset;

determining, at the at least one processor, a second location within the network to position the data subset and the one or more resources based on one or more metrics and the user instructions; and providing, in response to a request to access the data subset, at the at least one processor, access to the data subset by:

storing the data subset within the second database; and positioning the second database at the second location.

7. The method of claim 6, wherein the one or more resources further comprises an application container and wherein providing access to the data subset further comprises storing the application container at the second location to enable the access to the data subset stored in the second database.

8. The method of claim 6, further comprising receiving a request to access the data stored within the network, the request comprising a query resulting in the data subset.

9. The method of claim 6, wherein the network is a cloud, the one or more metrics is selected from the group consisting of latency, cost efficiencies, temporal considerations, and geographic location.

10. The method of claim 6, further comprising generating a plurality of input forms for receiving input identifying the data and articulating how to configure the one or more resources.

11. A non-transitory computer readable medium encoded with instructions for providing data mobility, the instructions, executable by a processor, comprising:

receiving, from a client and at at least one processor, user instructions identifying a data subset of data and how the data subset of the data is to be redistributed within a network when the data subset is subsequently requested to be accessed on the network;

configuring one or more resources for accessing the data subset of data, the data stored in a first database at a first location within the network, the one or more resources comprising a second database for storing the data subset;

determining a second location within the network to position the data subset and the one or more resources based on one or more metrics and the user instructions; and providing, in response to a request to access the data subset, access to the data subset by:

storing the subset of the data within the second database; and positioning the second database at the second location.

12. The non-transitory computer readable medium of claim 11, wherein the one or more resources further comprises an application container and wherein providing access to the data subset further comprises storing the application container at the second location to enable the access to the data subset.

13. The non-transitory computer readable medium of claim 11, the instructions further comprising receiving a request to access the data stored within the network, the request comprising a query resulting in the data subset.

14. The non-transitory computer readable medium of claim 11, wherein the one or more metrics is selected from the group consisting of latency, cost efficiencies, temporal considerations, and geographic location.

15. The non-transitory computer readable medium of claim 11, the instructions further comprising generating a plurality of input forms for receiving the instructions.

* * * * *